(12) United States Patent
Araki et al.

(10) Patent No.: US 10,935,186 B2
(45) Date of Patent: Mar. 2, 2021

(54) DEVICE EQUIPPED WITH TANK

(71) Applicant: TOYOTA JIDOSHA KABUSHIKI KAISHA, Toyota (JP)

(72) Inventors: Yasushi Araki, Gotemba (JP); Keisuke Fujita, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 196 days.

(21) Appl. No.: 16/129,100

(22) Filed: Sep. 12, 2018

(65) Prior Publication Data

US 2019/0093826 A1 Mar. 28, 2019

(30) Foreign Application Priority Data

Sep. 22, 2017 (JP) .............................. JP2017-182982

(51) Int. Cl.
*F17C 13/02* (2006.01)
*F17C 5/06* (2006.01)
(Continued)

(52) U.S. Cl.
CPC ............ *F17C 13/025* (2013.01); *F17C 5/007* (2013.01); *F17C 5/06* (2013.01); *F17C 13/12* (2013.01);
(Continued)

(58) Field of Classification Search
CPC ........ F17C 13/025; F17C 5/007; F17C 13/12; F17C 5/06; F17C 2223/036; F17C 2250/043; F17C 2250/0473; F17C 2205/0335; F17C 2223/0123; F17C 2225/036; F17C 2270/0139;
(Continued)

(56) References Cited

U.S. PATENT DOCUMENTS 8,534,327 B2 * 9/2013 Inagi .......................... F17C 5/06
141/4
2012/0111447 A1 * 5/2012 Mori ....................... F17C 3/025
141/4
(Continued)

FOREIGN PATENT DOCUMENTS

CN 103674444 A * 3/2014
CN 103674444 A 3/2014
(Continued)

*Primary Examiner* — Timothy P. Kelly
*Assistant Examiner* — Stephanie A Shrieves
(74) *Attorney, Agent, or Firm* — Finnegan, Henderson, Farabow, Garrett & Dunner, LLP (57) ABSTRACT

A device equipped with a tank includes: a tank storing gas; a receptacle to be coupled to a gas supply nozzle; a filling passage communicating the tank with the receptacle; and a determination unit configured to determine whether there is a leak in the filling passage based on an amount of decrease in pressure in the filling passage per unit time, after supplying of the gas cooled to below freezing to the tank through the receptacle and the filling passage is finished, when a temperature of the receptacle is a predetermined temperature or greater and a pressure in the filling passage in a state where all valves opening and closing the filling passage are closed is greater than a first pressure, wherein the receptacle incorporates a check valve inhibiting backflow of the gas from the filling passage.

7 Claims, 5 Drawing Sheets

(51) Int. Cl.
*F17C 5/00* (2006.01)
*F17C 13/12* (2006.01)

(52) U.S. Cl.
CPC ............. *F17C 2205/0142* (2013.01); *F17C 2205/037* (2013.01); *F17C 2205/0323* (2013.01); *F17C 2205/0335* (2013.01); *F17C 2221/012* (2013.01); *F17C 2223/0123* (2013.01); *F17C 2223/036* (2013.01); *F17C 2225/0123* (2013.01); *F17C 2225/036* (2013.01); *F17C 2227/0337* (2013.01); *F17C 2250/032* (2013.01); *F17C 2250/034* (2013.01); *F17C 2250/043* (2013.01); *F17C 2250/0434* (2013.01); *F17C 2250/0439* (2013.01); *F17C 2250/0473* (2013.01); *F17C 2250/0626* (2013.01); *F17C 2260/038* (2013.01); *F17C 2265/065* (2013.01); *F17C 2270/0139* (2013.01); *F17C 2270/0168* (2013.01); *F17C 2270/0184* (2013.01)

(58) Field of Classification Search
CPC ...... F17C 2270/0168; F17C 2225/0123; F17C 2205/037; F17C 2250/034; F17C 2205/0142; F17C 2205/0323; F17C 2221/012; F17C 2227/0337; F17C 2250/032; F17C 2250/0434; F17C 2250/0439; F17C 2250/0626; F17C 2260/038; F17C 2265/065; F17C 2270/0184; F17D 1/02; F17D 3/01; F17D 5/02
USPC ........................................................ 141/4
See application file for complete search history.

(56) References Cited

U.S. PATENT DOCUMENTS

| | | | | |
|---|---|---|---|---|
| 2012/0125482 | A1* | 5/2012 | Mori | F17C 5/007 141/98 |
| 2012/0205003 | A1* | 8/2012 | Okawachi | F17C 5/00 141/95 |
| 2013/0014854 | A1* | 1/2013 | Mori | F17C 5/007 141/1 |
| 2013/0014855 | A1* | 1/2013 | Yahashi | F17C 5/00 141/1 |
| 2013/0061983 | A1 | 3/2013 | Komiya et al. | |
| 2014/0265305 | A1* | 9/2014 | Thompson | F16L 19/043 285/89 |
| 2014/0272671 | A1* | 9/2014 | Handa | B60L 53/66 429/515 |
| 2014/0295305 | A1* | 10/2014 | Wake | H01M 8/04425 429/429 |
| 2015/0362383 | A1* | 12/2015 | Komiya | F17C 13/025 702/99 |
| 2015/0377416 | A1* | 12/2015 | Miyoshi | G05D 7/0635 141/95 |

FOREIGN PATENT DOCUMENTS

| | | | |
|---|---|---|---|
| CN | 106641719 A | | 5/2017 |
| JP | 2008-256552 A | | 10/2008 |
| JP | 2010-266023 | | 11/2010 |
| JP | 2010266023 A | * | 11/2010 |
| JP | 2011-047491 | | 3/2011 |
| JP | 2011047491 A | * | 3/2011 |
| JP | 2011-094652 A | | 5/2011 |
| JP | 5310877 | | 10/2013 |
| JP | 2014-055600 | | 3/2014 |
| JP | 2014055600 A | * | 3/2014 |

\* cited by examiner

DEVICE EQUIPPED WITH TANK

CROSS-REFERENCE TO RELATED APPLICATION

This application is based upon and claims the benefit of priority of the prior Japanese Patent Application No. 2017-182982, filed on Sep. 22, 2017, the entire contents of which are incorporated herein by reference.

FIELD OF THE INVENTION

The present invention relates to a device equipped with a tank.

BACKGROUND

The tank of a device equipped with a tank is filled with gas by supplying gas from a gas supply facility. It has been suggested to check, prior to gas filling, a leak in a gas passage through which gas supplied from the gas supply facility to the tank flows as disclosed in, for example, Japanese Patent Application Publication Nos. 2014-55600 and 2010-266023 (hereinafter, referred to as Patent Documents 1 and 2, respectively).

SUMMARY OF THE INVENTION

It is an object of the present invention to provide a device equipped with a tank capable of discovering a leak in a gas passage that has occurred during gas filling early.

The above object is achieved by a device equipped with a tank, including: a tank storing gas to be supplied to a gas consumption apparatus; a receptacle to be coupled to a gas supply nozzle of a gas supply facility; a filling passage communicating the tank with the receptacle; and a determination unit configured to determine whether there is a leak of the gas from the filling passage, wherein the receptacle incorporates a check valve configured to inhibit the gas from flowing from the tank toward the receptacle in the filling passage, and the determination unit is configured to determine whether there is a leak of the gas from the filling passage based on an amount of decrease in pressure in the filling passage per unit time, after supplying of the gas cooled to a temperature below a freezing point of water from the gas supply facility to the tank through the receptacle and the filling passage is finished, when (i) a temperature of the receptacle is equal to or greater than a predetermined temperature at which water does not freeze and (ii) a pressure in the filling passage in a state where all valves for opening and closing the filling passage are closed is greater than a first pressure greater than atmospheric pressure.

A supply passage coupled to the tank, the gas supplied from the tank to the gas consumption apparatus flowing through the supply passage; a communication passage of which a first end is coupled to the filling passage and a second end is coupled to the supply passage; a buffer tank located in the communication passage and storing the gas supplied from the tank to the supply passage; a first valve switching between communication and non-communication between the filling passage and the buffer tank; and a valve controller controlling the first valve may be provided, and the valve controller may be configured to control the first valve to communicate the filling passage with the buffer tank so that the gas is supplied from the buffer tank to the filling passage, after the supplying of the gas cooled to the temperature below the freezing point of water from the gas supply facility to the tank through the receptacle and the filling passage is finished, when (i) the temperature of the receptacle is equal to or greater than the predetermined temperature and (ii) the pressure in the filling passage in the state where all the valves for opening and closing the filling passage are closed is equal to or less than the first pressure, and control the first valve so that the filling passage is not communicated with the buffer tank after the pressure in the filling passage becomes greater than the first pressure.

A second valve switching between communication and non-communication between the supply passage and the buffer tank may be provided.

The second end of the communication passage may be coupled to the supply passage at a location further downstream than a pressure adjustment valve located in the supply passage.

A flow volume adjuster located in the communication passage between the second end of the communication passage and the buffer tank may be provided, and the second end of the communication passage may be coupled to the supply passage at a location further upstream than a pressure adjustment valve located in the supply passage.

An extraction passage of which a first end is coupled to the filling passage and a second end is coupled to an external connection unit capable of connecting to an external tank storing gas; a valve switching between communication and non-communication between the filling passage and the external connection unit; and a valve controller controlling the valve may be provided, and the valve controller may be configured to control the valve to communicate the filling passage with the external connection unit so that the gas is supplied from the external tank to the filling passage, after the supplying of the gas cooled to the temperature below the freezing point of water from the gas supply facility to the tank through the receptacle and the filling passage is finished, when (i) the temperature of the receptacle is equal to or greater than the predetermined temperature and (ii) the pressure in the filling passage in the state where all the valves for opening and closing the filling passage are closed is equal to or less than the first pressure, and control the valve so that the filling passage is not communicated with the external connection unit after the pressure in the filling passage becomes greater than the first pressure.

A fuel cell as the gas consumption apparatus may be provided, and fuel gas that is the gas stored in the tank may be supplied to the fuel cell.

DETAILED DESCRIPTION

In Patent Documents 1 and 2, a leak is checked prior to gas filling. Thus, if something goes wrong during the gas filling and a leak occurs in the gas passage, the discovery of the leak is delayed because the leak is not checked until next gas filling.

Hereinafter, with reference to the accompanying drawings, embodiments of the present invention will be described.

First Embodiment

Figure 1:
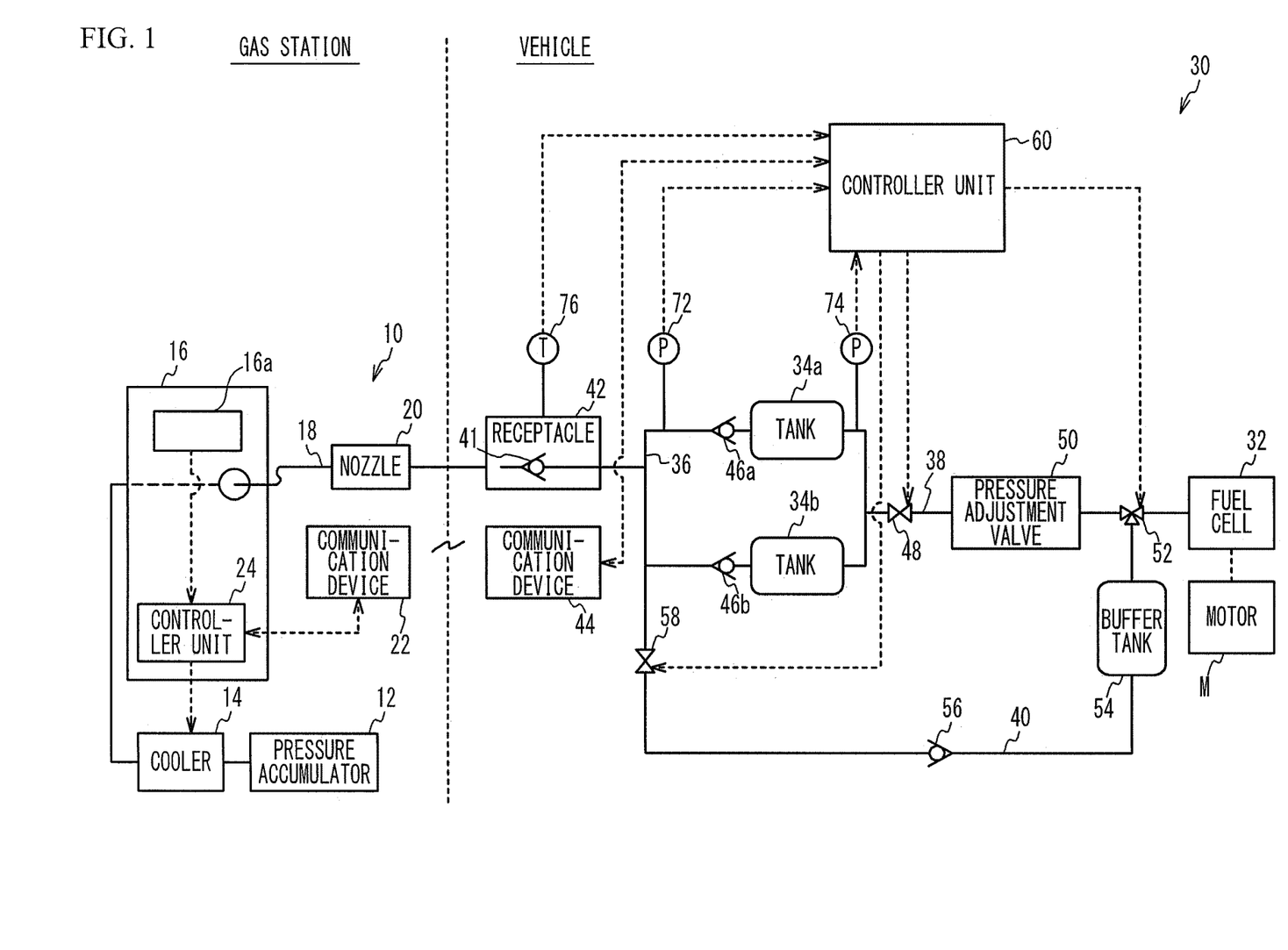
FIG. 1 is an explanatory diagram of a gas filling system including a vehicle in accordance with a first embodiment.

FIG. 1 is an explanatory diagram of a gas filling system including a vehicle in accordance with a first embodiment. As illustrated in FIG. 1, a gas filling system includes a vehicle 30 that runs on electric power generated by a fuel cell 32 that generates electric power with fuel gas, and a gas station (gas supply facility) 10 that fills tanks 34a and 34b of the vehicle 30 with fuel gas. The vehicle 30 is an example of a device equipped with a tank. The same applies to second through fourth embodiments. Additionally, the first through fourth embodiments will describe an example in which two tanks 34a and 34b are provided, but one tank or three or more tanks may be provided.

First, the gas station 10 will be described. The gas station 10 includes a pressure accumulator 12, a cooler 14, a dispenser 16, a filling hose 18, a nozzle 20, a communication device 22, and a controller unit 24. The pressure accumulator 12 stores hydrogen gas supplied from a hydrogen curdle (not illustrated) and of which the pressure is raised to a predetermined pressure by a compressor. The cooler 14 pre-cools the hydrogen gas from the pressure accumulator 12. The dispenser 16 sends the hydrogen gas from the cooler 14, to the filling hose 18 coupled to the dispenser 16. The dispenser 16 has an operating panel 16a that receives settings, by the user, of a desired target filling amount or target filling pressure of the hydrogen gas with which the tanks 34a and 34b of the vehicle 30 are to be filled.

The nozzle 20 is attached to the end of the filling hose 18. The controller unit 24 is a microcomputer including a Central Processing Unit (CPU), a Read Only Memory (ROM), a Random Access Memory (RAM), and a memory. The controller unit 24 is electrically connected to the cooler 14 and the communication device 22, and controls the operation of the whole of the gas station 10.

Next, the vehicle 30 will be described. The vehicle 30 includes the fuel cell 32, the tanks 34a and 34b, a filling passage 36, a supply passage 38, a communication passage 40, a receptacle 42, a communication device 44, check valves 46a and 46b, a valve 48, a pressure adjustment valve 50, a valve 52, a buffer tank 54, a check valve 56, a valve 58, pressure sensors 72 and 74, a temperature sensor 76, and a controller unit 60. The fuel cell 32 generates electric power from supplied oxidant gas and hydrogen gas supplied from the tanks 34a and 34b through the supply passage 38. The tanks 34a and 34b are able to be filled with high-pressure hydrogen gas.

The filling passage 36 guides the hydrogen gas supplied from the gas station 10 to the tanks 34a and 34b. The receptacle 42 communicates with the end of the filling passage 36, is to be connected with the nozzle 20 at the time of filling the tanks 34a and 34b with hydrogen gas, and is provided in, for example, the lid box of the vehicle 30. The receptacle 42 incorporates a check valve 41 that keeps the hydrogen gas from the filling passage 36 from flowing backward. A motor M is a motor for running the vehicle 30 that is driven by electric power supplied from the fuel cell 32 and of which the power is transmitted to at least front wheels or rear wheels of the vehicle 30.

The check valves 46a and 46b allow the transfer of hydrogen gas from the receptacle 42 to the tanks 34a and 34b, and inhibit the transfer of hydrogen gas from the tanks 34a and 34b to the receptacle 42. The valve 48 is a two-way electromagnetic valve, and switches between communication and non-communication between the tanks 34a and 34b and the supply passage 38 by opening and closing thereof. The pressure sensor 72 detects the pressure value in the filling passage 36. The pressure sensor 74 detects the pressure value in a passage between the tanks 34a and 34b and the valve 48. The pressure value detected by the pressure sensor 74 is approximately equal to the pressure values in the tanks 34a and 34b. The temperature sensor 76 detects the temperature of the receptacle 42.

During filling of the tanks 34a and 34b with the hydrogen gas from the gas station 10, the pressure at the gas station 10 side is greater than the pressures in the tanks 34a and 34b. Thus, the check valves 46a and 46b open and the tanks 34a and 34b are thereby communicated with the receptacle 42, while the valve 48 closes and the tanks 34a and 34b are thereby not communicated with the supply passage 38. Accordingly, usually, during filling of the tanks 34a and 34b with hydrogen gas and immediately after filling of the tanks 34a and 34b with hydrogen gas is finished, the pressure value in the filling passage 36 indicated by the pressure sensor 72 is approximately equal to the pressure values in the tanks 34a and 34b indicated by the pressure sensor 74.

A first end of the communication passage 40 is coupled to and communicated with the filling passage 36, and a second end of the communication passage 40 is coupled to the supply passage 38. The second end of the communication passage 40 is coupled to one of the ports of the valve 52 that is a three-way electromagnetic valve located in the supply passage 38. The remaining two ports of the valve 52 connect to the supply passage 38. The valve 52 normally communicates between the tanks 34a and 34b and the fuel cell 32 in a state in which no current is applied to the valve 52. However, when current is applied, the valve 52 communicates between the tanks 34a and 34b and the buffer tank 54 located in the communication passage 40. Accordingly, the hydrogen gas supplied from the tanks 34a and 34b to the supply passage 38 is allowed to be stored in the buffer tank 54 by applying current to the valve 52.

The pressure adjustment valve 50 is located in the supply passage 38, and adjusts the pressure of the hydrogen gas supplied from the tanks 34a and 34b to the supply passage 38 to a proper pressure. For example, the pressure adjustment valve 50 is a pressure reducing valve, and reduces the pressure of high-pressure hydrogen gas supplied from the tanks 34a and 34b to the supply passage 38 to a proper pressure. The valve 52 is located in the supply passage 38 and is located further downstream than the pressure adjustment valve 50. Thus, the buffer tank 54 is supplied with the hydrogen gas of which the pressure has been adjusted (e.g., reduced) to a proper pressure.

The valve 58 is a two-way electromagnetic valve, and is located in the communication passage 40 between the buffer tank 54 and the filling passage 36. Thus, opening and closing of the valve 58 switches between communication and non-communication between the buffer tank 54 and the filling passage 36. Located in the communication passage 40 between the buffer tank 54 and the valve 58 is the check valve 56 for inhibiting hydrogen gas from flowing from the filling passage 36 into the buffer tank 54.

The controller unit 60 is a microcomputer including a CPU, a ROM, a RAM, and a memory, and controls the operation of the whole of the vehicle 30 based on input signals. The controller unit 60 is electrically connected to the communication device 44, the valves 48, 52, and 58, the pressure sensors 72 and 74, and the temperature sensor 76. Although the details will be described later, the controller unit 60 checks a leak in the filling passage 36 after filling of the tanks 34*a* and 34*b* with hydrogen gas is finished. A leak is checked by a determination unit and a valve controller that are functionally implemented by the CPU, the ROM, the RAM, and the memory of the controller unit 60.

The controller unit 24 of the gas station 10 and the controller unit 60 of the vehicle 30 transmit and receive predetermined information to and from each other through the communication devices 22 and 44. The communication devices 22 and 44 are able to wirelessly communicate with each other via infrared communication or the like. The controller unit 24 obtains information such as the pressures and the gas temperatures in the tanks 34*a* and 34*b* from the controller unit 60 of the vehicle 30 through the communication devices 22 and 44. The controller unit 24 may obtain information such as the allowable filling amounts of the tanks 34*a* and 34*b* and the allowable pressures of the tanks 34*a* and 34*b*. The controller unit 24 controls each device at the gas station 10 based on the information obtained from the vehicle 30 and information such as the target filling amount of hydrogen gas received through the operating panel 16*a* of the dispenser 16 to control the filling speed and the filling amount of hydrogen gas to the vehicle 30. The communication devices 22 and 44 are respectively provided near the nozzle 20 and the receptacle 42, and are able to communicate with each other while the nozzle 20 and the receptacle 42 are connected.

Figure 2:
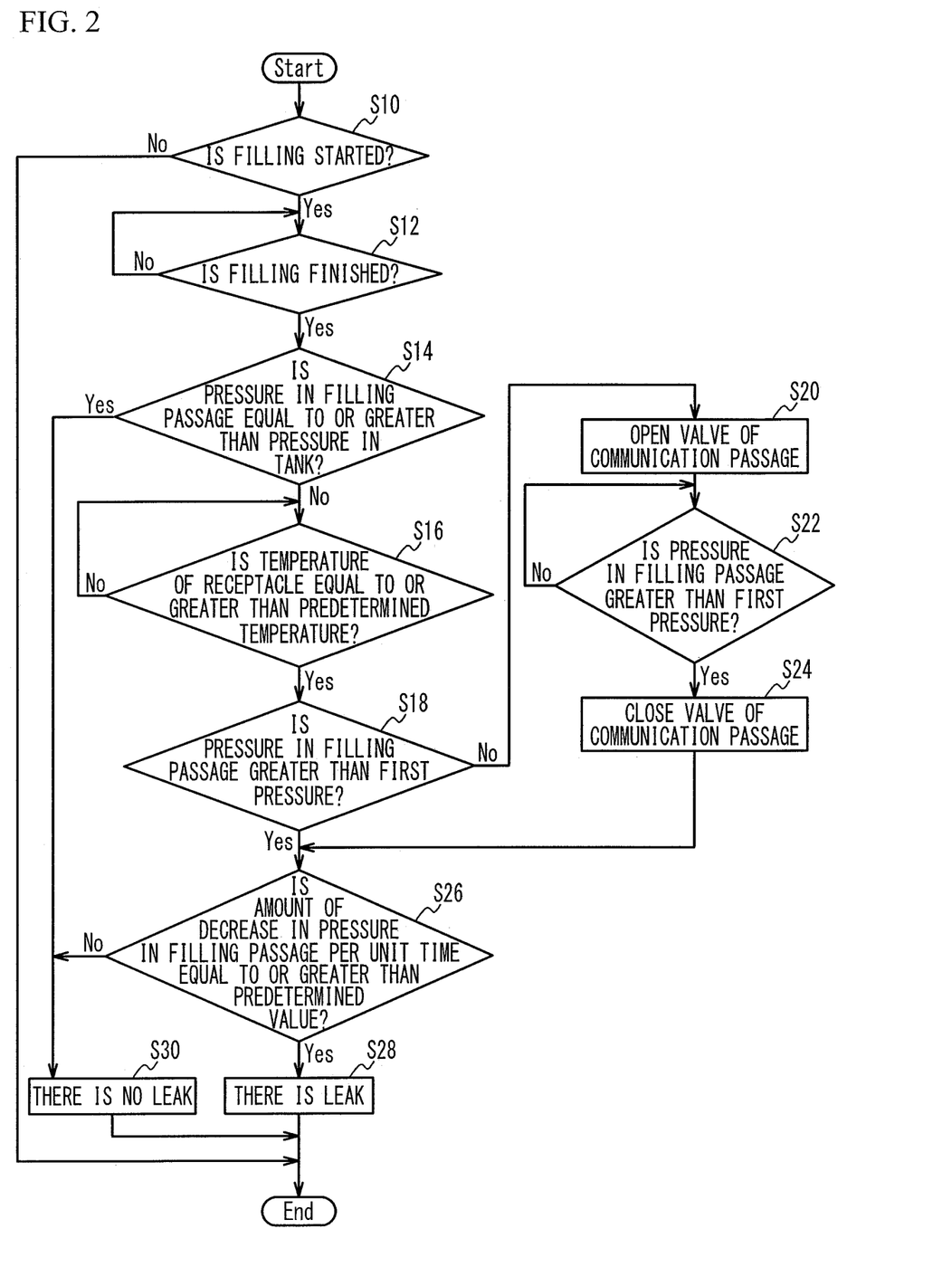
FIG. 2 is a flowchart of a leak check in the first embodiment.

FIG. 2 is a flowchart of a leak check in the first embodiment. As illustrated in FIG. 2, at step S10, the controller unit 60 determines whether hydrogen-gas filling has been started. For example, when the communication between the communication devices 22 and 44 is established or a rise in pressure value in the filling passage 36 indicated by the pressure sensor 72 is detected, it is determined that hydrogen-gas filling has been started. When hydrogen-gas filling is not started yet (step S10: No), this process is ended. The start of hydrogen-gas filling opens the check valves 46*a* and 46*b* so that the receptacle 42 is communicated with the tanks 34*a* and 34*b*.

After hydrogen-gas filling is started (step S10: Yes), the controller unit 60 moves to step S12, and determines whether the hydrogen-gas filling has been finished. For example, it is determined whether the hydrogen-gas filling has been finished based on whether the pressure value in the filling passage 36 indicated by the pressure sensor 72 becomes a constant value. When the hydrogen-gas filling is not finished yet (step S12: No), the process of step S12 is executed again. On the other hand, when the hydrogen-gas filling has been finished (step S12: Yes), since the pressure at the gas station 10 side and the pressures at the tanks 34*a* and 34*b* become approximately equal to each other, the check valves 46*a* and 46*b* are closed, the receptacle 42 becomes not communicated with the tanks 34*a* and 34*b*, and the process moves to step S14. The controller unit 24 of the gas station 10 determines whether the amount of hydrogen gas actually filled into the tanks 34*a* and 34*b* from the start of the hydrogen-gas filling has reached the target filling amount. When the actual filling amount has reached the target filling amount, the controller unit 24 closes an electromagnetic valve located at the connecting point between the dispenser 16 and the filling hose 18.

Then, at step S14, the controller unit 60 determines whether the pressure value in the filling passage 36 indicated by the pressure sensor 72 is equal to or greater than the pressure values in the tanks 34*a* and 34*b* indicated by the pressure sensor 74. As described above, during hydrogen-gas filling and immediately after the end of the hydrogen-gas filling, the pressure in the filling passage 36 is normally approximately equal to the pressures in the tanks 34*a* and 34*b*. Thus, the following causes are considered as the cause of the pressure in the filling passage 36 being less than the pressures in the tanks 34*a* and 34*b*. The first cause is that the check valve 41 in the receptacle 42 freezes and does not operate normally, and thereby, the hydrogen gas in the filling passage 36 flows backward from the receptacle 42 to the gas station 10. That is, when filling of the tanks 34*a* and 34*b* with hydrogen gas is finished, the hydrogen gas is sucked down the filling hose 18 from the nozzle 20 in the gas station 10. However, when the check valve 41 in the receptacle 42 freezes and does not operate normally, the hydrogen gas in the filling passage 36 may be sucked down the gas station 10. The reason why the check valve 41 in the receptacle 42 freezes is because the hydrogen gas supplied from the gas station 10 is cooled to a predetermined low temperature (e.g., $-20°$ C. to $-40°$ C.) by the cooler 14 and then supplied to inhibit a rise in temperatures of the tanks 34*a* and 34*b*. The second cause is that an anomaly such as cracks is caused in the filling passage 36 and a leak thereby occurs. As described above, when the pressure in the filling passage 36 is lower than the pressures in the tanks 34*a* and 34*b* (step S14: No), there may be a leak in the filling passage 36. Thus, the process moves to step S16. On the other hand, when the pressure in the filling passage 36 is equal to or greater than the pressures in the tanks 34*a* and 34*b* (step S14: Yes), it is considered that the normal pressure state is being established and a leak does not occur in the filling passage 36. Thus, the controller unit 60 moves to step S30, determines that there is no leak in the filling passage 36, and ends the process.

At step S16, the controller unit 60 determines whether the temperature of the receptacle 42 indicated by the temperature sensor 76 is equal to or greater than a predetermined temperature at which water does not freeze. For example, it is determined whether the temperature of the receptacle 42 indicated by the temperature sensor 76 is $0°$ C. or greater. The reason why it is determined whether the temperature of the receptacle 42 is greater than the predetermined value at which water does not freeze is as follows. That is, when the check valve 41 in the receptacle 42 freezes, the check valve 41 does not operate normally, and thereby, the hydrogen gas in the filling passage 36 may flow backward from the receptacle 42 to the gas station 10. In such a state, it is difficult to determine which is the reason for the reduced pressure in the filling passage 36, a leak due to an anomaly such as cracks caused in the filling passage 36 or the check valve in the receptacle 42 freezing and not operating normally.

When the temperature of the receptacle 42 is lower than the predetermined temperature (step S16: No), it is considered that the check valve 41 in the receptacle 42 freezes. Thus, the process of step S16 is executed again. On the other hand, when the temperature of the receptacle 42 is equal to or greater than the predetermined temperature (step S16: Yes), it is considered that the check valve 41 in the receptacle 42 does not freeze and normally operates. Thus, the process moves to step S18. The normal operation of the check valve 41 in the receptacle 42 causes all the valves (the check valves 46*a*, 46*b*, and 41 and the valve 58) for opening and closing the filling passage 36 to be closed.

At step S18, the controller unit 60 determines whether the pressure value in the filling passage 36 indicated by the pressure sensor 72 is greater than a first pressure that is greater than the atmospheric pressure (1013 hPa). The first pressure has a value greater than the atmospheric pressure to the extent enough to check a leak, is not particularly limited, and is, for example, 1500 hPa. The state in which the check valve 41 in the receptacle 42 freezes and does not normally operate may cause the hydrogen gas in the filling passage 36 to flow back to the gas station 10, and the pressure in the filling passage 36 may become thereby equal to or less than the first pressure. In such a case, even when a leak has occurred in the filling passage 36, it is difficult to check a leak in the filling passage 36 because the speed at which the hydrogen gas in the filling passage 36 is discharged from the filling passage 36 to the outside is low and the amount of decrease in pressure per unit time is small. Thus, when the pressure in the filling passage 36 is equal to or less than the first pressure (step S18: No), the process moves to step S20. On the other hand, when the pressure in the filling passage 36 is greater than the first pressure (step S18: Yes), the process moves to step S26.

At step S20, the controller unit 60 opens the valve 58 located in the communication passage 40 to communicate the buffer tank 54 with the filling passage 36. The buffer tank 54 stores the hydrogen gas supplied from the tanks 34a and 34b to the supply passage 38 in advance. Thus, by opening the valve 58 to communicate the buffer tank 54 with the filling passage 36, hydrogen gas is supplied from the buffer tank 54 to the filling passage 36. Hydrogen gas is preliminarily stored in the buffer tank 54 by applying a current to the valve 52 when the output current of the fuel cell 32 is 0 A (ampere), for example, during deceleration or idling of the vehicle 30. Hydrogen gas is preferably stored in the buffer tank 54 at least once during one trip, which is the operation trip of the fuel cell 32, more preferably several times. Alternatively, the arrival at the gas station 10 may be detected with a Global Positioning System (GPS) installed in the vehicle 30, and when the vehicle 30 has arrived at the gas station 10 and the fuel cell 32 is stopped, hydrogen gas may be stored in the buffer tank 54 by applying a current to the valve 52.

At step S22, the controller unit 60 determines whether the pressure value in the filling passage 36 indicated by the pressure sensor 72 becomes greater than the first pressure. When the pressure in the filling passage 36 is still equal to or less than the first pressure (step S22: No), the valve 58 remains opened so that hydrogen gas continues to be supplied from the buffer tank 54 to the filling passage 36. On the other hand, when the pressure in the filling passage 36 becomes greater than the first pressure due to the supply of hydrogen gas from the buffer tank 54 to the filling passage 36 (step S22: Yes), the controller unit 60 closes the valve 58 at step S24 to cause the buffer tank 54 to be not communicated with the filling passage 36. The controller unit 60 then moves to step S26. Closing of the valve 58 causes all the valves (the check valves 46a, 46b, and 41 and the valve 58) for opening and closing the filling passage 36 to be closed again.

At step S26, the controller unit 60 determines whether the amount of decrease in the pressure value in the filling passage 36 indicated by the pressure sensor 72 per unit time is equal to or greater than a predetermined value. The predetermined value is a value with which it is possible to determine whether a leak occurs in the filling passage 36, and is set in advance. When the amount of decrease in pressure in the filling passage 36 per unit time is less than the predetermined value (step S26: No), it is considered that no leak occurs in the filling passage 36. Thus, the controller unit 60 moves to step S30, determines that no leak occurs in the filling passage 36, and ends the process.

On the other hand, when the amount of decrease in pressure in the filling passage 36 is equal to or greater than the predetermined value (step S26: Yes), it is considered that the pressure in the filling passage 36 is reduced because of a leak in the filling passage 36 since all the check valves 46a, 46b, and 41 and the valve 58 are closed. Therefore, the controller unit 60 moves to step S28, determines that there is a leak in the filling passage 36, and ends the process. At step S28, the controller unit 60 may raise an alarm for informing the driver of the vehicle 30 or an operator of the gas station 10 of the occurrence of a leak in the filling passage 36. For example, a warning light may be displayed on the meter panel of the vehicle 30 or a horn may be blown. Alternatively, the start of the fuel cell 32 may be prohibited.

In the first embodiment, the controller unit 60 determines whether there is a leak in the filling passage 36 after filling of the tanks 34a and 34b with the hydrogen gas cooled to a temperature below the freezing point is finished as illustrated in FIG. 2. The controller unit 60 determines whether there is a leak based on the amount of decrease in pressure in the filling passage 36 per unit time when (i) the temperature of the receptacle 42 is equal to or greater than a predetermined value at which water does not freeze and (ii) the pressure in the filling passage 36 in a state where all the valves (the check valves 46a, 46b, and 41 and the valve 58) for opening and closing the filling passage 36 are closed is greater than the first pressure. This configuration enables to check a leak in the filling passage 36 in a state in which the check valve 41 in the receptacle 42 does not freeze and normally operates. Therefore, it is possible to appropriately determine whether there is a leak in the filling passage 36. Since a leak in the filling passage 36 is checked by the above-described method after filling of the tanks 34a and 34b with gas is finished, a leak that has occurred in the filling passage 36 during the gas filling is discovered early.

In addition, in the first embodiment, as illustrated in FIG. 1, the vehicle 30 includes the supply passage 38 through which the hydrogen gas supplied from the tanks 34a and 34b to the fuel cell 32 flows, and the communication passage 40 of which the first end is coupled to the filling passage 36 and the second end is coupled to the supply passage 38. Located in the communication passage 40 is the buffer tank 54 that stores the hydrogen gas supplied from the tanks 34a and 34b to the supply passage 38 and the valve 58 that switches between communication and non-communication between the filling passage 36 and the buffer tank 54. After filling of the tanks 34a and 34b with hydrogen gas is finished, the controller unit 60 controls the valve 58 to communicate the filling passage 36 with the buffer tank 54 so that hydrogen gas is supplied from the buffer tank 54 to the filling passage 36 when the temperature of the receptacle 42 is equal to or greater than the predetermined temperature and the pressure in the filling passage 36 is equal to or less than the first pressure as illustrated in FIG. 2. Thereafter, the controller unit 60 controls the valve 58 to cause the filling passage 36 to be not communicated with the buffer tank 54 after the pressure in the filling passage 36 becomes greater than the first pressure. This configuration enables to make the pressure in the filling passage 36 greater than the first pressure even when the pressure in the filling passage 36 becomes equal to or less than the first pressure due to the freezing of the check valve 41 in the receptacle 42 and the back flow of the hydrogen gas in the filling passage 36 to the gas station 10. Therefore, it is possible to check a leak in the filling passage 36 even in such a case.

In addition, since the vehicle 30 includes the communication passage 40, the buffer tank 54, and the valve 58, it is possible to check a leak in the filling passage 36 not only immediately after filling of the tanks 34a and 34b with hydrogen gas is finished but also in other cases. For example, at a dealer's site, by opening the valve 58 to supply hydrogen gas from the buffer tank 54 to the filling passage 36, it is possible to check a leak in the filling passage 36.

In addition, in the first embodiment, as illustrated in FIG. 1, the valve 52 switching between communication and non-communication between the supply passage 38 and the buffer tank 54 is provided. This configuration allows the hydrogen gas stored in the tanks 34a and 34b to be supplied to the fuel cell 32 usually and to be supplied to the buffer tank 54 depending on the situation, thereby reducing deterioration in fuel economy.

In addition, in the first embodiment, the communication passage 40 is coupled to the supply passage 38 at the location further downstream than the pressure adjustment valve 50 located in the supply passage 38 as illustrated in FIG. 1. This configuration causes the hydrogen gas of which the pressure is adjusted to a proper pressure by the pressure adjustment valve 50 to flow into the communication passage 40, thus inhibiting the pressure in the communication passage 40 from being excessively high. Therefore, components with low-pressure specifications can be used for the buffer tank 54 and the check valve 56. Since it is sufficient if the hydrogen gas supplied from the buffer tank 54 to the filling passage 36 has a pressure greater than the first pressure even when the hydrogen gas is not a high-pressure gas, the configuration in which the communication passage 40 is coupled to the supply passage 38 at a location further downstream than the pressure adjustment valve 50 can be employed. The use of a component with high-pressure specification for the check valve 56 achieves fail safe if something wrong happens in the valve 58.

Figure 3:
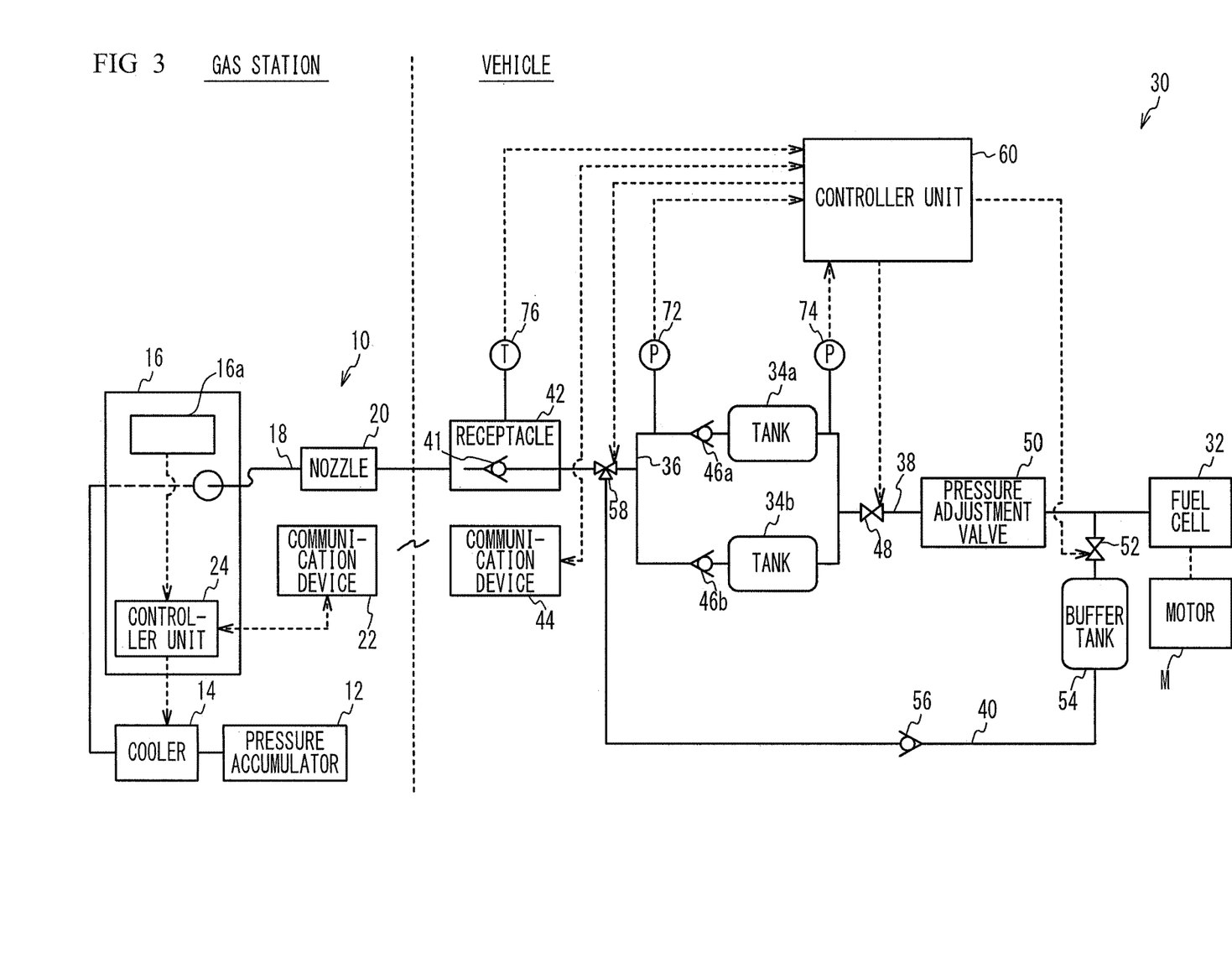
FIG. 3 is an explanatory diagram of a gas filling system including a vehicle in accordance with a first variation of the first embodiment.

FIG. 3 is an explanatory diagram of a gas filling system including a vehicle in accordance with a first variation of the first embodiment. As illustrated in FIG. 3, the valve 52 may be a two-way electromagnetic valve located in the communication passage 40. The valve 58 may be a three-way electromagnetic valve of which one port connects to the first end of the communication passage 40 and the remaining two ports connects to the filling passage 36. The valve 58 may communicate the filling passage 36 located further upstream than the valve 58 (the filling passage 36 at the receptacle 42 side) with the filling passage 36 located further downstream than the valve 58 (the filling passage 36 at the tanks 34a and 34b side) in a state where a current is not applied to the valve 58, and may communicate the communication passage 40 with the filling passage 36 located further downstream than the valve 58 (the filling passage 36 at the tanks 34a and 34b side) when a current is applied to the valve 58.

Second Embodiment

Figure 4:
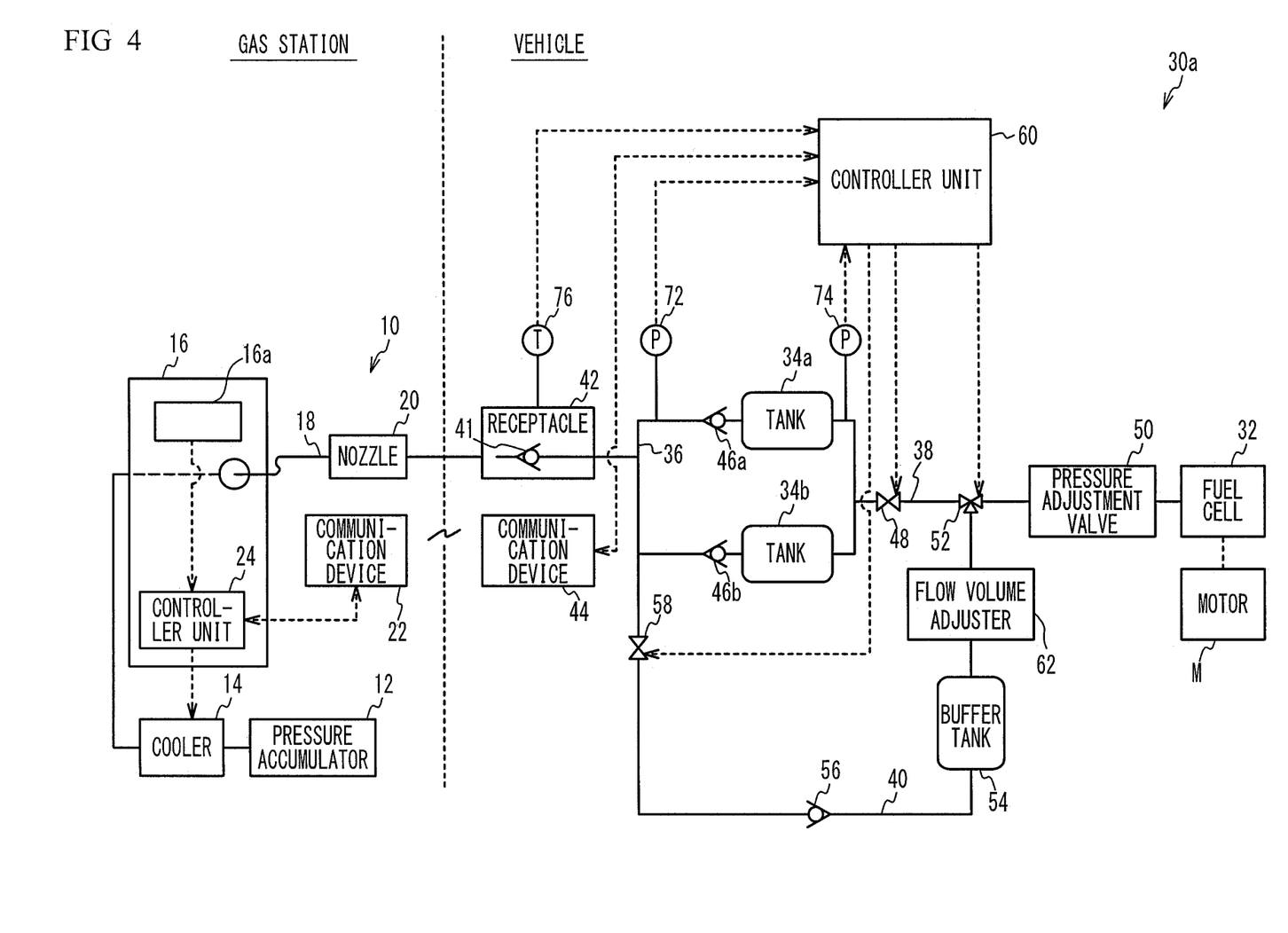
FIG. 4 is an explanatory diagram of a gas filling system including a vehicle in accordance with a second embodiment.

FIG. 4 is an explanatory diagram of a gas filling system including a vehicle in accordance with a second embodiment. As illustrated in FIG. 4, in a vehicle 30a of the second embodiment, the valve 52 to which the communication passage 40 is coupled is located in the supply passage 38 and is located further upstream than the pressure adjustment valve 50. A flow volume adjuster 62 is located in the communication passage 40 between the valve 52 and the buffer tank 54. The flow volume adjuster 62 is, for example, an orifice or a duty control valve, and adjusts the flow volume of hydrogen gas flowing from the supply passage 38 into the buffer tank 54. Other structures are the same as those of the first embodiment illustrated in FIG. 1, and the description thereof is thus omitted. Additionally, the method of checking a leak in the second embodiment is the same as that of the first embodiment illustrated in FIG. 2, and the description thereof is thus omitted.

In the second embodiment, the communication passage 40 is connected to the supply passage 38 at the location further upstream than the pressure adjustment valve 50 located in the supply passage 38. This configuration makes the pressure at the time of determining the presence or absence of a leak of hydrogen gas high, therefore, improving the accuracy of the leak check. In this case, since hydrogen gas of a large flow volume may flow into the buffer tank 54 and deteriorate fuel economy, the flow volume adjuster 62 is preferably located between the connecting point between the communication passage 40 and the supply passage 38 and the buffer tank 54. This configuration inhibits hydrogen gas of a large flow volume from rapidly flowing into the buffer tank 54. Since high-pressure hydrogen gas is supplied to the communication passage 40, components with high-pressure specifications are preferably used for the buffer tank 54 and the check valve 56.

Third Embodiment

Figure 5:
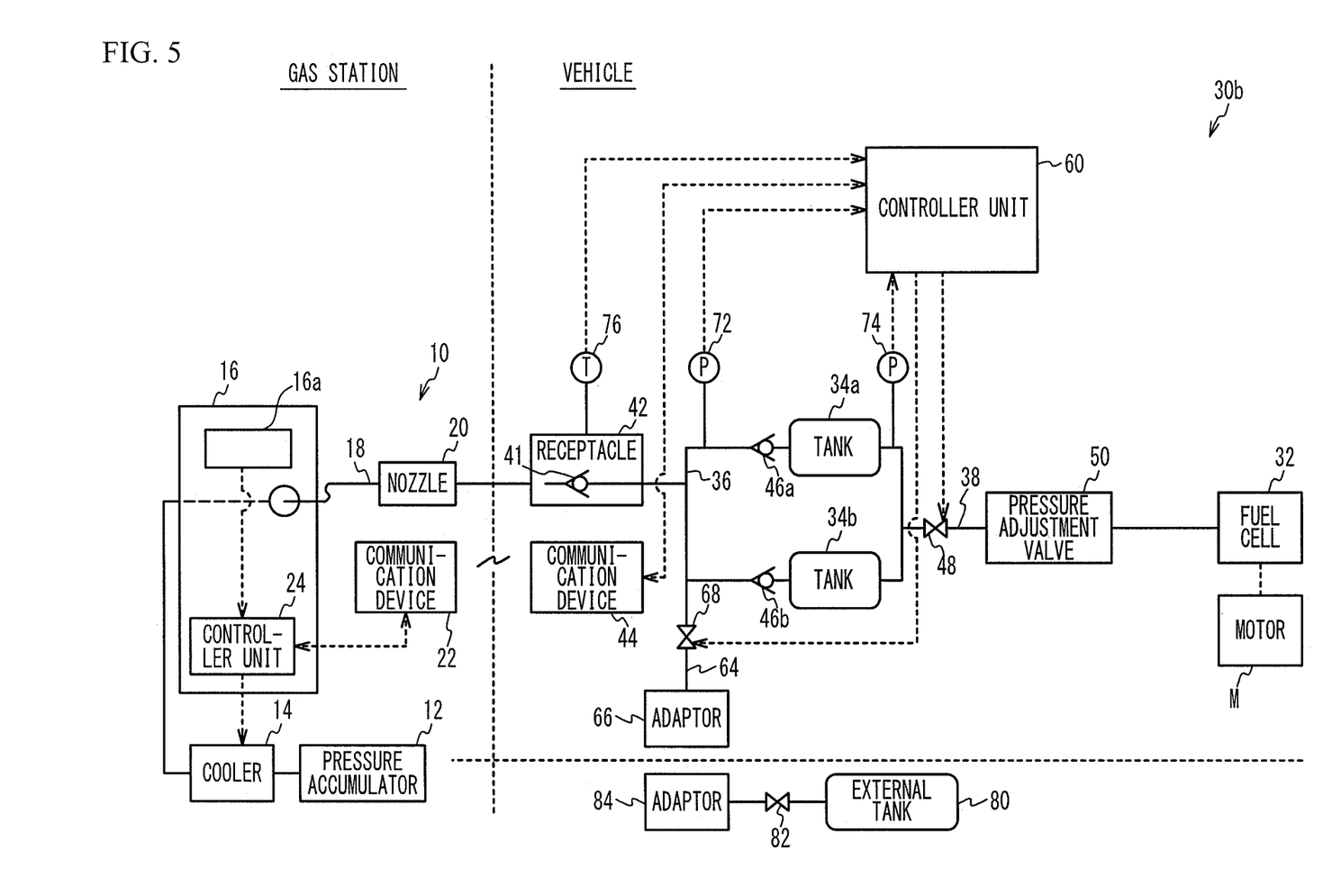
FIG. 5 is an explanatory diagram of a gas filling system including a vehicle in accordance with a third embodiment.

FIG. 5 is an explanatory diagram of a gas filling system including a vehicle in accordance with a third embodiment. As illustrated in FIG. 5, in a vehicle 30b of the third embodiment, the communication passage 40 is not provided, and the buffer tank 54, the check valve 56, and the valve 58 located in the communication passage 40 are not provided either. Instead, provided is an extraction passage 64 of which a first end is coupled to and communicated with the filling passage 36 and a second end is coupled to an adapter 66 that is able to connect to an external tank 80 storing hydrogen gas so as to communicate with the external tank 80. The adapter 66 is an example of an external connection unit capable of connecting to the external tank 80. The external tank 80 is, for example, a portable tank, and may be a curdle as an example. A valve 68 that is a two-way electromagnetic valve switching between communication and non-communication between the filling passage 36 and the adapter 66 is located in the extraction passage 64. Other structures are the same as those of the first embodiment illustrated in FIG. 1, and the description thereof is thus omitted.

Coupled to the adapter 66 is an adapter 84 connecting to the external tank 80 through a valve 82 in the leak check. The leak check in the third embodiment opens and closes the valve 68 of the extraction passage 64 at steps S20 and S24 in FIG. 2 of the first embodiment instead of opening and closing the valve 58 of the communication passage 40. Opening of the valve 68 of the extraction passage 64 causes hydrogen gas to be supplied from the external tank 80 coupled to the adapter 66 to the filling passage 36.

In the third embodiment, the vehicle 30b includes the extraction passage 64 of which the first end is coupled to the filling passage 36 and the second end is coupled to the adapter 66 capable of connecting to and being communicated with the external tank 80. The valve 68 that switches between communication and non-communication between the filling passage 36 and the adapter 66 is located in the extraction passage 64. After filling of the tanks 34a and 34b with hydrogen gas is finished, the controller unit 60 controls the valve 68 to communicate the filling passage 36 with the adapter 66 so that gas is supplied from the external tank 80 to the filling passage 36 when (i) the temperature of the receptacle 42 is equal to or greater than a predetermined temperature at which water does not freeze and (ii) the pressure in the filling passage 36 is equal to or less than the first pressure greater than the atmospheric pressure. Thereafter, after the pressure in the filling passage 36 becomes greater than the first pressure, the valve 68 is controlled so that the filling passage 36 is not communicated with the adapter 66. This control allows the pressure in the filling passage 36 to be greater than the first pressure even when the pressure in the filling passage 36 becomes equal to or less than the first pressure, therefore, allowing a leak in the filling passage 36 to be checked. In addition, it is not necessary to install a buffer tank in the vehicle 30b.

In the third embodiment, when the external tank 80 is prepared at, for example, a dealer's site, the leak check for the filling passage 36 is possible by supplying hydrogen gas from the external tank 80 to the filling passage 36 by connecting the external tank 80 to the extraction passage 64 through the adapter 84 and the adapter 66.

In the third embodiment, the gas stored in the external tank 80 is not limited to hydrogen gas, and may be other gasses such as nitrogen gas. Also in the third embodiment, the valve 68 may be a three-way electromagnetic valve as with the valve 58 of the first variation of the first embodiment.

In the first through third embodiments, the temperature of the receptacle 42 is obtained with the temperature sensor 76 provided to the receptacle 42, but the temperature of the receptacle 42 may be obtained by providing a temperature sensor to a part having a temperature correlating with the temperature of the receptacle 42.

The first through third embodiments have described fuel cells as an example of a gas consumption apparatus, but the gas consumption apparatus may be an internal-combustion engine using hydrogen gas such as a hydrogen-fueled engine or an internal-combustion engine using Liquid Petroleum Gas (LPG) for fuel. In the case of these internal-combustion engines, examples of gas with which a tank is filled include, but are not limited to, liquefied petroleum gas, liquefied natural gas, and compressed natural gas in addition to hydrogen gas. A vehicle has been described as an example of a device equipped with a tank, but the device equipped with a tank may be other than a vehicle, and may be filled with gas other than above exemplified gas.

Although some embodiments of the present invention have been described in detail, the present invention is not limited to the specific embodiments but may be varied or changed within the scope of the present invention as claimed.

What is claimed is:

1. A device equipped with a tank, comprising:
   a tank storing gas to be supplied to a gas consumption apparatus;
   a receptacle to be coupled to a gas supply nozzle of a gas supply facility;
   a filling passage communicating the tank with the receptacle;
   a supply passage coupled to the tank, the gas supplied from the tank to the gas consumption apparatus flowing through the supply passage;
   a communication passage of which a first end is coupled to the filling passage and a second end is coupled to the supply passage;
   a buffer tank located in the communication passage and storing the gas supplied from the tank to the supply passage;
   a first valve switching between communication and non-communication between the filling passage and the buffer tank;
   a determination unit configured to determine whether there is a leak of the gas from the filling passage; and
   a valve controller controlling the first valve, wherein
   the receptacle incorporates a check valve configured to inhibit the gas from flowing from the tank toward the receptacle in the filling passage,
   the valve controller is configured to control the first valve to communicate the filling passage with the buffer tank so that the gas is supplied from the buffer tank to the filling passage, after the supplying of the gas cooled to a temperature below a freezing point of water from the gas supply facility to the tank through the receptacle and the filling passage is finished, when (i) a temperature of the receptacle is equal to or greater than a predetermined temperature at which water does not freeze and (ii) a pressure in the filling passage in a state where the first valve and the check valve for opening and closing the filling passage are closed is equal to or less than a first pressure greater than atmospheric pressure, and control the first valve so that the filling passage is not communicated with the buffer tank after the pressure in the filling passage becomes greater than the first pressure, and
   the determination unit is configured to determine whether there is a leak of the gas from the filling passage based on an amount of decrease in pressure in the filling passage per unit time, after supplying of the gas cooled to the temperature below the freezing point of water from the gas supply facility to the tank through the receptacle and the filling passage is finished, when (i) the temperature of the receptacle is equal to or greater than the predetermined temperature at which water does not freeze and (ii) the pressure in the filling passage in the state where the first valve and the check valve for opening and closing the filling passage are closed is greater than the first pressure greater than atmospheric pressure.

2. The device equipped with a tank according to claim 1, further comprising a second valve switching communication and non-communication between the supply passage and the buffer tank.

3. The device equipped with a tank according to claim 1, wherein the second end of the communication passage is coupled to the supply passage at a location further downstream than a pressure adjustment valve located in the supply passage.

4. The device equipped with a tank according to claim 1, further comprising a flow volume adjuster located in the communication passage between the second end of the communication passage and the buffer tank, wherein
   the second end of the communication passage is coupled to the supply passage at a location further upstream than a pressure adjustment valve located in the supply passage.

5. The device equipped with a tank according to claim 1, further comprising:
   an extraction passage of which a first end is coupled to the filling passage and a second end is coupled to an external connection unit capable of connecting to an external tank storing gas; and
   a third valve switching between communication and non-communication between the filling passage and the external connection unit, wherein the valve controller is configured to control the third valve to communicate the filling passage with the external connection unit so that the gas is supplied from the external tank to the filling passage, after the supplying of the gas cooled to the temperature below the freezing point of water from the gas supply facility to the tank through the receptacle and the filling passage is finished, when (i) the temperature of the receptacle is equal to or greater than the predetermined temperature and (ii) the pressure in the filling passage in the state where the first valve and the check valve for opening and closing the filling passage are closed is equal to or less than the first pressure, and control the third valve so that the filling passage is not communicated with the external connection unit after the pressure in the filling passage becomes greater than the first pressure.

6. The device equipped with a tank according to claim 1, further comprising a fuel cell as the gas consumption apparatus, wherein
fuel gas that is the gas stored in the tank is supplied to the fuel cell.

7. The device equipped with a tank according to claim 1, wherein
the valve controller is configured to control the first valve to communicate the filling passage with the buffer tank so that the gas is supplied from the buffer tank to the filling passage after part replacement of a high-pressure pipe, the tank, or an on-off valve, and control the first valve so that the filling passage is not communicated with the buffer tank after the pressure in the filling passage becomes greater than the first pressure.

* * * * *